Patented July 3, 1945

2,379,431

UNITED STATES PATENT OFFICE 2,379,431

POLYMERIZATION OF BUTADIENES

Charles F. Fryling, Akron, Ohio, assignor, by mesne assignments, to The B. F. Goodrich Company, Akron, Ohio, a corporation of New York No Drawing. Application June 27, 1941, Serial No. 400,092

10 Claims. (Cl. 260—84.5)

This invention relates to the polymerization of butadienes, and has as its principal object the reduction of the time required to effect the polymerization of butadienes in the form of aqueous emulsions.

It is well known that butadiene-1,3 and other butadienes or mixtures of a butadiene and a monomer copolymerizable therewith can be polymerized in the form of an aqueous emulsion. Although the use of emulsifying agents such as glue, gelatin, saponin, and starch has been suggested, much of the literature on emulsion polymerization refers to the use of salts of organic bases containing long carbon chains as the emulsifying agents. Polymerizations performed in this manner have usually required several days or even weeks to reach completion, and the properties of the polymers have been variable and unpredictable.

I have discovered that the polymerization of butadiene in the form of an aqueous emulsion in the presence of an organic base containing a long carbon chain proceeds more rapidly in the presence of an activator comprising a compound ionizable to yield copper ions and a compound ionizable to yield bisulfite compounds.

The manner in which an activator of this type affects polymerization reactions may be better understood from the following specific example. A mixture of 70 parts by weight of butadiene, 30 parts of methyl methacrylate, about 250 parts of a 2% aqueous solution of the hydrochloride of diethylamino-ethyloleylamide, and one part of trichloracetic acid was agitated at 50° C. After 73 hours, the latex-like product was stabilized with an antioxidant and coagulated to yield 94 parts of a rubber-like polymer. When the experiment was repeated in the presence of a mixture of 0.0001 part of $CuSO_4 \cdot 5H_2O$ and 0.5 part of $NaHSO_3$, 97 parts of a rubber-like polymer were obtained in only 23 hours. Although the activator was added at the start of the polymerization, it is within the scope of the invention to incorporate the activator in the emulsion at any time prior to the completion of the polymerization.

Only a very small amount of copper need be present during the polymerization. It has been found that in the presence of a bisulfite, only 0.0000025% of copper in the form of a compound ionizable to yield copper ions has a pronounced activating effect upon the polymerization process. The preferred amount of copper compound contains between about 0.000005 and 0.00003% of copper based on the polymerizable material.

If too much copper is employed, the polymerization reaction will be retarded rather than accelerated. Thus, in the butadiene-methyl methacrylate system mentioned above, the presence of 0.0001% of copper has a slight retarding action which becomes more pronounced as the amount of copper is increased. Certain systems will tolerate the presence of more copper than others, but it will in general be found that 0.00003% of copper will be tolerated and that more can often be employed before the inhibiting effect becomes undesirably pronounced. It is in general desirable to use the smallest amount of copper which will cause the polymerization to reach completion in the desired time.

Polymerization reactions are not as sensitive to the presence of bisulfite as to copper, and the proportion of bissulfite in the form of a compound ionizable to yield bisulfite ions can be varied over a rather wide range. An amount of such a compound providing as little as 0.001% or even less based on the polymerizable material of bisulfite may be employed, while 1% or more may be used if desired.

The compound ionizable to yield copper ions may be any available material, even rather insoluble copper compounds being utilizable because of the extremely small amounts required. The commonly occurring mineral acid salts such as cupric chloride, cupric sulfate, or cupric nitrate are the preferred materials. Cuprous salts may also be employed. Any desired compound ionizable to yield bisulfite ions may be employed, bisulfites derived from alkali-forming metals such as sodium bisulfite, potassium bisulfite, calcium bisulfite, etc. being preferred.

As another specific example, a mixture of 70 parts of butadiene, 30 parts of methyl methacrylate, about 250 parts of a 2% solution of the hydrochloride of diethylaminoethyloleylamide, 0.3 part of diisopropyl dixanthogen, and one part of trichloracetic acid was agitated for 117 hours at 50° C. before the polymerization reached completion. The addition of an aqueous solution containing 0.00005 part of $CuSO_4 \cdot 5H_2O$ and 0.25 part of $NaHSO_3$ reduced the time required to effect polymerization to 45 hours. Doubling the amount of catalyst reduced the polymerization time to 26 hours. Tripling the amount of catalyst further increased the rate of reaction, but slightly decreased the yield. When the above experiment was repeated in the presence of 0.0001 part of $CuSO_4 \cdot 5H_2O$ but no bisulfite, the polymerization required 117 hours; when 0.5 part of NaHSO₄ were used without copper, the polymerization required 142 hours.

Other salts of organic bases containing long carbon chains than the one employed in the specific examples may be used as the emulsifying agent. As examples may be mentioned the hydrochloride of diethylaminoethoxyoleyl-anilide, cetyl trimethyl ammonium bromide, N-stearyl betaine, C-cetyl betaine, the dimethyl sulfate addition product of cetyl dimethylamino benzoate, the acetate of diethylaminoethyloleylamide, etc., the compounds in which the long carbon chain contains at least 12 carbon atoms being preferred. The acidity of the solution will vary with the amount of emulsifying agent and other acidic materials employed. A pH in the range of 2 to 7 is in general satisfactory.

Although it is not necessary, it is often desirable to add an initiator of polymerization to the emulsion. Suitable materials include per-compounds such as hydrogen peroxide, benzoyl peroxide, ammonium persulfate, potassium persulfate, and other peroxides and per-salts such as persulfates, perborates, percarbonates, and the like. Other chlorinated compounds which favorably influence polymerization under acid conditions such as carbon tetrachloride may be substituted for the trichloracetic acid, and other sulfur-containing compounds which increase the plasticity and solubility of the polymers such as the tetraalkyl thiuram mono- and polysulfides and the 2-mercaptothiazoles may be substituted for the diisopropyl dixanthogen.

Mixtures of ionizable copper and bisulfite compounds are useful as activators not only in the copolymerization of butadiene and methyl methacrylate, but also in the polymerization of other butadienes either alone or in admixture with monomers copolymerizable therewith. As an example, a mixture of 70 parts of butadiene and 30 parts of styrene was agitated at 50° C. in the presence of about 250 parts of a 2% aqueous solution of the hydrochloric of diethylaminoethyloleylamide, one part of trichloracetic acid, 0.3 part of diisopropyl dixanthogen, 0.0001 part of $CuSO_4 \cdot 5H_2O$ and 0.5 part of $NaHSO_3$. The polymerization was completed in 28 hours, while several days were required to effect the polymerization in the absence of the activator. Other butadienes such as isoprene, 2,3-dimethyl butadiene, piperylene, and chloroprene alone or in admixture may be employed. As examples of materials which may be copolymerized with butadienes may be mentioned, besides methyl methacrylate and styrene, acrylonitrile, methacrylonitrile, vinyl naphthalene, ethyl methacrylate, methyl acrylate, vinyl acetate, vinylidene chloride, methyl vinyl ketone, methyl vinyl ether, and similar unsaturated hydrocarbons, nitriles, esters, ketones, and ethers.

The terms "butadienes" and "a butadiene" as herein employed signify butadiene-1,3 and homologues and analogues of butadiene-1,3 which enter into polymerization reactions in essentially the same manner.

Although I have herein disclosed specific embodiments of my invention, I do not intend to limit the invention solely thereto, for many variations and modifications are within the spirit and scope of the invention as defined in the appended claims.

I claim:

1. In a process of polymerizing a butadiene-1,3 in the form of an aqueous emulsion in the presence of a salt of an organic base containing a chain of at least 12 carbon atoms as an emulsifying agent, the step which comprises incorporating in the emulsion prior to the completion of the polymerization an activator consisting of a compound ionizable to yield copper ions and a compound ionizable to yield bisulfite ions.

2. In a process of polymerizing a butadiene-1,3 in the form of an aqueous emulsion in the presence of a salt of an organic base containing a chain of at least 12 carbon atoms as an emulsifying agent, the step which comprises incorporating in the emulsion prior to the completion of the polymerization not over 0.0001%, based on the polymerizable material, of copper in the form of a compound ionizable to yield copper ions and not over 1%, based on the polymerizable material, of bisulfite in the form of a compound ionizable to yield bisulfite ions.

3. A process defined in claim 2 in which between 0.000005 and 0.00003% of copper is employed.

4. In a process of polymerizing a butadiene-1,3 in the form of an aqueous emulsion in the presence of a salt of an organic base containing a chain of at least 12 carbon atoms as an emulsifying agent, the step which comprises incorporating in the emulsion prior to the completion of the polymerization not over 0.0001%, based on the polymerizable material, of copper in the form of a mineral acid salt and not over 1%, based on the polymerizable material, of bisulfite in the form of a bisulfite of an alkali-forming metal.

5. A process defined in claim 4 in which between 0.000005 and 0.00003% of copper is employed.

6. In a process of copolymerizing butadiene-1,3 and methyl methacrylate in the form of an aqueous emulsion in the presence of a salt of an organic base containing a chain of at least 12 carbon atoms as an emulsifying agent, the step which comprises incorporating in the emulsion prior to the completion of the polymerization an activator consisting of a compound ionizable to yield copper ions and a compound ionizable to yield bisulfite ions.

7. In a process of copolymerizing in the form of an aqueous emulsion butadiene-1,3 and a monomer copolymerizable therewith in aqueous emulsion in the presence of a salt of diethylaminoethoxyoleylanilide as an emulsifying agent, the step which comprises incorporating in the emulsion prior to the completion of the polymerization not over 0.0001%, based on the polymerizable material, of a compound ionizable to yield copper ions and not over 1%, based on the polymerizable material of a compound ionizable to yield bisulfite ions.

8. The method of claim 7 in which between 0.000005 and 0.00003% of copper is employed.

9. In a process of copolymerizing in the form of an aqueous emulsion butadiene-1,3 and a monomer copolymerizable therewith aqueous emulsion in the presence of a salt of diethylaminoethyloleylamide as an emulsifying agent, the step which comprises incorporating in the emulsion prior to the completion of the polymerization not over 0.0001%, based on the polymerizable material, of copper in the form of a compound ionizable to yield copper ions and not over 1%, based on the polymerizable material, of bisulfite in the form of a compound ionizable to yield bisulfite ions.

10. The method of claim 9 in which between 0.000005 and 0.00003% of copper is employed.

CHARLES F. FRYLING.

CERTIFICATE OF CORRECTION.

Patent No. 2,379,431. July 3, 1945.

CHARLES F. FRYLING.

It is hereby certified that error appears in the printed specification of the above numbered patent requiring correction as follows: Page 2, first column, line 43, for "hydrochloric" read --hydrochloride--; and second column, line 62, claim 9, after the word "therewith" insert --in--; and that the said Letters Patent should be read with this correction therein that the same may conform to the record of the case in the Patent Office.

Signed and sealed this 6th day of November, A. D. 1945.

Leslie Frazer (Seal)                     First Assistant Commissioner of Patents.